(12) United States Patent
Min (10) Patent No.: US 11,895,540 B2
(45) Date of Patent: Feb. 6, 2024

(54) NETWORK HANDOVER METHOD DURING PING-PONG HANDOVER, COMPUTER DEVICE, AND STORAGE MEDIUM

(71) Applicant: ONEPLUS TECHNOLOGY (SHENZHEN) CO., LTD., Guangdong (CN)

(72) Inventor: Zeke Min, Shenzhen (CN)

(73) Assignee: ONEPLUS TECHNOLOGY (SHENZHEN) CO., LTD., Guangdong (CN)

( * ) Notice: Subject to any disclaimer, the term of this patent is extended or adjusted under 35 U.S.C. 154(b) by 379 days.

(21) Appl. No.: 17/359,484

(22) Filed: Jun. 25, 2021

(65) Prior Publication Data

US 2021/0329506 A1 Oct. 21, 2021

Related U.S. Application Data

(63) Continuation of application No. PCT/CN2019/128171, filed on Dec. 25, 2019.

(30) Foreign Application Priority Data

Dec. 25, 2018 (CN) .......................... 201811591515.8

(51) Int. Cl.
 *H04W 36/00* (2009.01)
(52) U.S. Cl.
 CPC ... *H04W 36/0058* (2018.08); *H04W 36/0094* (2013.01); *H04W 36/00837* (2018.08)
(58) Field of Classification Search
 None
 See application file for complete search history.

(56) References Cited

U.S. PATENT DOCUMENTS 10,499,294 B1 * 12/2019 Tayal .................. H04W 76/27
2012/0077502 A1   3/2012 Liu
(Continued)

FOREIGN PATENT DOCUMENTS

CN   103298040 A   9/2013
CN   104080105 A   10/2014
(Continued)

OTHER PUBLICATIONS

International Search Report in the international application No. PCT/CN2019/128171, dated Mar. 23, 2020.
(Continued)

*Primary Examiner* — Anh Ngoc M Nguyen
(74) *Attorney, Agent, or Firm* — Ladas & Parry, LLP (57) ABSTRACT

The disclosure relates to a network handover method, a computer device, and a storage medium. The method comprises: when a ping-pong handover is detected, recording the number of ping-pong handovers; when the number of ping-pong handovers reaches a pre-set number of times, acquiring an optimized reporting parameter; measuring the signal strength of the current camping cell and a neighbor cell to obtain measurement results; and based on the measurement results and the optimized reporting parameter, determining whether an A3 event is reported. By the method, when the number of ping-pong handovers of a terminal reaches the pre-set number of times, whether the A3 event is reported is determined according to the optimized reporting parameter and the measurement results.

17 Claims, 5 Drawing Sheets

(56) References Cited

U.S. PATENT DOCUMENTS

2014/0213259 A1    7/2014    Teyeb
2014/0274063 A1    9/2014    Singh et al.
2015/0358868 A1*   12/2015    Wegmann ....... H04W 36/00837
                                                                                                         455/436

FOREIGN PATENT DOCUMENTS

| CN | 104717703 A | 6/2015 |
| CN | 104717704 A | 6/2015 |
| CN | 105144785 A | 12/2015 |
| CN | 107302778 A | 10/2017 |
| CN | 108271194 A | 7/2018 |
| CN | 109041134 A | 12/2018 |
| CN | 109600806 A | 4/2019 |
| EP | 2749082 A1 | 7/2014 |
| EP | 3188544 A1 | 7/2017 |
| WO | 2020/135473 A1 | 7/2020 |

OTHER PUBLICATIONS

English translation of the Written Opinion of the International Search Authority in the international application No. PCT/CN2019/128171, dated Mar. 23, 2020.

Intel Corporation, "Fast Handover using RSRQ/RSRP with SToS/Ping-pong Avoidance", 3GPP TSG RAN WG2 Meeting #81bis R2-131396, Chicago, USA, Apr. 15-19, 2013, entire document.

Office Action of the Indian application No. 202117032618, dated Sep. 9, 2022.

First Office Action and search report of the Chinese application No. 201811591515.8, dated Feb. 3, 2020 with translation provided by Global Dossier.

Second Office Action of the Chinese application No. 201811591515.8, dated Jul. 17, 2020 with translation provided by Global Dossier.

Supplementary European Search Report in European application No. 19901459.8, dated Mar. 3, 2022.

* cited by examiner

NETWORK HANDOVER METHOD DURING PING-PONG HANDOVER, COMPUTER DEVICE, AND STORAGE MEDIUM

CROSS-REFERENCE TO RELATED APPLICATIONS

This is a continuation application of International Patent Application No. PCT/CN2019/128171, filed on Dec. 25, 2019, which claims priority to Chinese Patent Application No. 201811591515.8 filed on Dec. 25, 2018, the disclosures of which are hereby incorporated by reference in their entireties.

TECHNICAL FIELD

The disclosure relates to the technical field of communications, and in particular to a network handover method, a computer device, and a storage medium.

BACKGROUND

During Long Term Evolution (LTE) performs handover, a User Equipment (UE) needs to report a measurement result (including Reference Signal Receiving Power (RSRP), Reference Signal Receiving Quality (RSRQ), etc.). Different reporting events may trigger different handover types of the UE. For example, A3 event reporting may trigger co-frequency handover. B1 event reporting may trigger inter-system handover, etc.

At present, it is often seen in an existing network that signal measurement values of two frequency points configured in a data network at the same place are very close, some networks may meet an A3 event reporting threshold as long as the signal measurement values slightly fluctuate, then the UE reports an A3 event measurement report to the network, and the network will initiate a cell handover. In a wireless environment, a signal of a mobile terminal is greatly influenced by a direction of the mobile terminal and the holding of the mobile terminal by hand. As long as the bottom or the top of the mobile terminal is slightly blocked, or the direction of holding a mobile phone by hand changes, the signal measurement value may be influenced. Therefore, the handover of the mobile terminal between a serving cell and a neighbor cell back and forth, i.e. a ping-pong handover, easily occurs, and the frequent ping-pong handover easily leads to poor user experience.

SUMMARY

In view of this, the disclosure provides a network handover method, a computer device, and a storage medium.

A network handover method includes the following operations.

A number of ping-pong handovers is recorded when a ping-pong handover is detected.

An optimized reporting parameter is acquired when the number of ping-pong handovers reaches a preset number.

Signal intensities of a current camping cell and a neighbor cell are measured to obtain a measurement result.

Whether to report an A3 event is determined based on the measurement result and the optimized reporting parameter.

A computer device includes a memory and a processor, herein the memory may store a computer program, and the processor may implement the steps of the above method when executing the computer program.

A computer-readable storage medium have a computer program stored thereon, herein the computer program, when being executed by a processor, cause the processor to implement the steps of the above method.

DETAILED DESCRIPTION

In order to make the purposes, technical solutions and advantages of the disclosure clearer, the disclosure will be further described in detail below with reference to the accompanying drawings and embodiments. It is to be understood that the specific embodiments described here are merely illustrative of the disclosure and are not intended to limit the disclosure.

Figure 1:
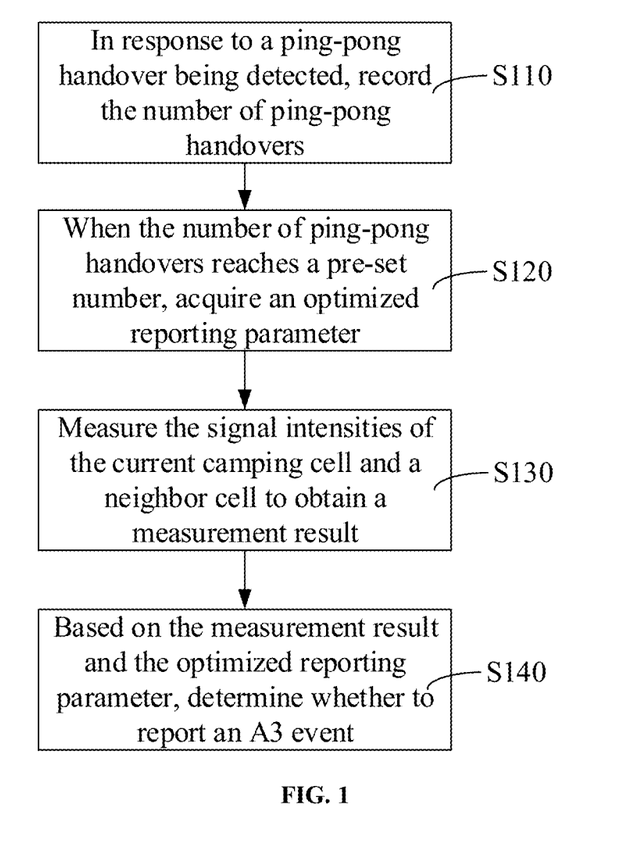
FIG. 1 is a schematic flowchart of a network handover method in an embodiment of the disclosure.

The disclosure provides a method, in an embodiment as shown in FIG. 1, including operations S110 to S140.

In operation S110, a number of ping-pong handovers is recorded when a ping-pong handover is detected.

The concept of the ping-pong handover is a phenomenon in which a terminal (e.g., a mobile phone) performs handover back and forth between a current camping serving cell and a neighbor cell. Since stealing frames are used to send a handover command in a handover process, continuous stealing frames lead to extremely unclear voice quality and poor data service experience, and thus the ping-pong handover is easy to influence user experience. In the embodiment, a number of ping-pong handovers is recorded when the ping-pong handover of the terminal is detected.

In an embodiment, the operation that the number of ping-pong handovers is recorded includes the following operations. The number of ping-pong handovers is increased by 1, a pre-handover cell is updated to a current last camping cell, and a post-handover cell is updated to a current camping cell, when the post-handover cell is a last camping cell. Or, the number of ping-pong handovers is set to be zero, the pre-handover cell is updated to the last camping cell, and the post-handover cell is updated to the current camping cell, when the post-handover cell is not the last camping cell.

In the embodiment, a camping cell before the present handover (i.e. a pre-handover current camping cell) is recorded as the pre-handover cell, a camping cell after the present handover (i.e. a post-handover current camping cell) is recorded as the post-handover cell, and a previous camping cell of the current camping cell is recorded as the last camping cell. The number of ping-pong handovers is increased by 1 when it is detected that the post-handover cell is the last camping cell before the present handover. The number of ping-pong handovers is set to be zero when the cell after the present handover is not the last camping cell. For example, the current camping cell is cell A, and the last camping cell is cell B. When the terminal performs cell handover, the number of ping-pong handovers is increased by 1 when it is detected that the post-handover cell is cell B.

The number of ping-pong handovers is set to zero when it is detected that the post-handover cell is not cell B, e.g. the post-handover cell is cell C.

In the embodiment, the number of ping-pong handovers is recorded after the present handover is completed, the current camping cell and the last camping cell need to be recorded, the pre-handover cell is updated to a new last camping cell, and the post-handover cell is updated to a new current camping cell.

It may be understood that in other embodiments, the number of ping-pong handovers may be recorded in other ways.

In operation S120, an optimized reporting parameter is acquired when the number of ping-pong handovers reaches a preset number.

In operation S130, signal intensities of a current camping cell and a neighbor cell are measured to obtain a measurement result.

A reporting parameter represents a reporting parameter of an A3 event. In an embodiment, the reporting parameter includes a reference threshold and a reporting threshold. In the embodiment, the optimized reporting parameter represents a reporting parameter obtained after optimizing a standard reporting parameter when the number of ping-pong handovers reaches the preset number, and includes an optimized reference threshold and an optimized reporting threshold. The optimized reporting parameter may be set in advance according to standard network configuration and stored in the terminal, and the optimized reporting parameter is acquired when it is detected that the number of ping-pong handovers reaches the preset number. It may be understood that it is also possible to optimize according to the standard network configuration when it is detected that the number of ping-pong handovers reaches the preset number, thereby obtaining the optimized reporting parameter. Further, the optimized reference threshold and the optimized reporting threshold may be set according to actual conditions. In a specific embodiment, the optimized reference threshold is set to be −90 dbm, and the optimized reporting threshold is set to be 10 dbm. Further, optimized reporting conditions may be determined according to the optimized reporting parameter. For example, in an embodiment, the optimized reference threshold is set to be −90 dbm, and the optimized reporting threshold is set to be 10 dbm. Then the optimized reporting conditions may be specifically as follows: when the signal intensity of the current camping cell is lower than −90 dbm but higher than −100 dbm and the signal intensity of the neighbor cell is higher than the signal intensity of the current camping cell by 10 dbm or more, the A3 event is reported.

In the embodiment, when the number of ping-pong handovers of the terminal reaches the preset number, a signal intensity measurement result is judged by using the optimized reporting parameter to determine whether to report the A3 event. In an embodiment, the optimized reporting parameter is a preset parameter for determining whether to report the A3 event when it is detected that the number of ping-pong handovers reaches the preset number, and includes an optimized reference threshold and an optimized reporting threshold. In another embodiment, reporting parameters in the standard network configuration may be adjusted when it is detected that the number of ping-pong handovers reaches the preset number, to obtain the optimized reporting parameter. Further, whether to report the A3 event may be determined through the optimized reporting parameter and the current signal intensity measurement result.

The current camping cell represents a serving cell where a current terminal network of the terminal is located. The neighbor cell is relative to the serving cell, the neighbor cell is generally configured by a network side and sent to the terminal, the terminal may measure the serving cell and the neighbor cell according to the network configuration, and the current camping cell may be configured with multiple neighbor cells. In an embodiment, the measurement result includes the signal intensity of the current camping cell and the signal intensity of the neighbor cell. Further, in an embodiment, the signal intensities of the current camping cell and the neighbor cell are measured, and the measurement is initiated according to the network configuration; a measurement result is obtained, whether the measurement result meets a reporting condition is judged, and the A3 event is reported when the reporting condition is met.

In operation S140, whether to report an A3 event is determined based on the measurement result and the optimized reporting parameter.

The A3 event represents that the signal intensity of the neighbor cell is better than the signal intensity of the current camping cell, and this event may be used to determine whether a UE performs handover to the neighbor cell. When the measurement result meets the reporting condition, the A3 event is reported to request the network for handover of the serving cell.

In the embodiment, when it is detected that the number of ping-pong handovers of the terminal reaches the preset number, the optimized reporting parameter is acquired, a measurement result obtained by measuring the signal intensities of the current cell and the neighbor cell is acquired, and then whether to report the A3 event is determined according to the optimized reporting parameter and the measurement result.

Further, in an embodiment, an optimized handover condition may be determined according to the optimized reporting parameter, then whether the measurement result meets the optimized handover condition is judged, and whether to report the A3 event is determined. The A3 event is reported when the measurement result meets the optimized handover condition. The A3 event is not reported when the measurement result does not meet the optimal handover condition.

According to the network handover method, a handover count is recorded when it is detected that a ping-pong handover occurs in a terminal network. When the number of ping-pong handovers reaches a preset number, whether to report an A3 event is determined based on a measurement result obtained after measuring signal intensities of a current camping cell and a neighbor cell, and an acquired optimized reporting parameter. By the method, when it is detected that the number of ping-pong handovers of a terminal reaches the preset number, whether to report the A3 event is determined according to the optimized reporting parameter and the measurement result, so that irrational handovers may be prevented as much as possible, thereby improving the user experience.

Figure 2:
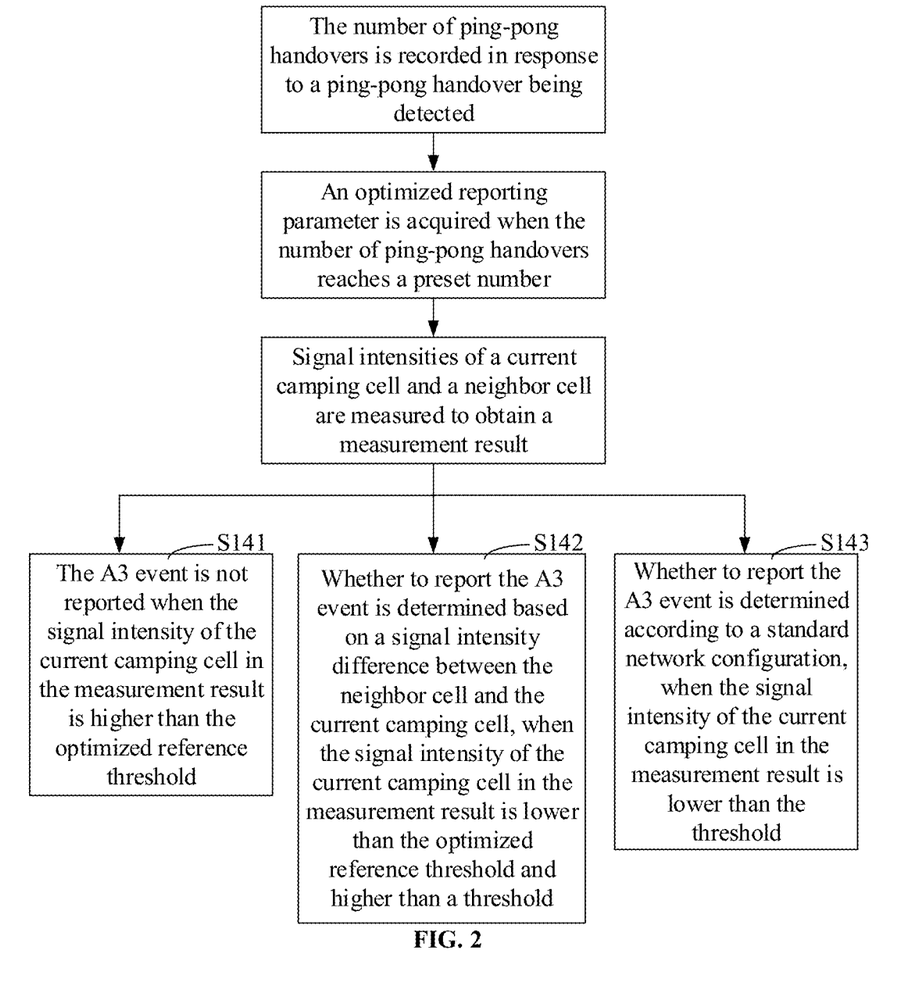
FIG. 2 is a schematic flowchart of a network handover method in another embodiment of the disclosure.

In an embodiment as shown in FIG. 2, the operation that whether to report the A3 event is determined based on the measurement result and the optimized reporting parameter includes the following operations S141 to S143.

In operation S141, the A3 event is not reported when the signal intensity of the current camping cell in the measurement result is higher than the optimized reference threshold.

In a specific embodiment, the optimized reference threshold is set to be −90 dbm. Therefore, in the embodiment, the A3 event is not reported when the signal intensity of the current camping cell in the measurement result is higher than −90 dbm. For example, in the embodiment, the A3 event is not reported when the signal intensity of the current camping cell is −80 dbm.

In operation S142, whether to report the A3 event is determined based on a signal intensity difference between the neighbor cell and the current camping cell, when the signal intensity of the current camping cell in the measurement result is lower than the optimized reference threshold and higher than a threshold.

The threshold may be set according to actual conditions. For example, in an embodiment, the optimized reference threshold is set to be −90 dbm, the threshold is set to −100 dbm, and when the signal intensity of the current camping cell in the measurement result is lower than −90 dbm, but higher than −100 dbm, whether to report the A3 event needs to be determined based on a signal intensity difference between the neighbor cell and the current camping cell. For example, in the embodiment, when the signal intensity of the current camping cell is −95 dbm, whether to report the A3 event is determined according to the signal intensity difference between the neighbor cell and the current camping cell.

In an embodiment, the operation that whether to report the A3 event is determined based on the signal intensity difference between the neighbor cell and the current camping cell, when the measurement result is that the signal intensity of the current camping cell is lower than the optimized reference threshold and higher than the threshold includes the following operations. The A3 event is reported when the signal intensity difference between the neighbor cell and the current camping cell reaches the optimized reporting threshold; and the A3 event is not reported when the signal intensity difference between the neighbor cell and the current camping cell does not reach the optimized reporting threshold.

The signal intensity of the current camping cell is subtracted from the signal intensity of the neighbor cell to obtain the signal intensity difference between the neighbor cell and the current camping cell. When the signal intensity difference is a positive number, it indicates that the signal intensity of the neighbor cell is better than that of the current camping cell. When the signal intensity difference is a negative number, it indicates that the signal intensity of the neighbor cell is weaker than that of the current camping cell. For example, in a specific embodiment, the optimized reference threshold is set to be −90 dbm, the threshold is set to be −100 dbm, and the optimized reporting threshold is 10 dbm. Therefore, in the embodiment, when the signal intensity of the current camping cell is lower than −90 dbm and higher than −100 dbm, the A3 event is reported when the signal intensity difference between the neighbor cell and the current camping cell exceeds 10 dbm; and the A3 event is not reported when the signal intensity difference between the neighbor cell and the current camping cell is less than 10 dbm. For example, in the embodiment, when the signal intensity of the current camping cell A is −95 dbm and the signal intensity of the neighbor cell B is −80 dbm, the signal intensity difference between the neighbor cell B and the current camping cell A is 15 dbm, and the optimized reporting threshold is reached, thus the A3 event is reported; when the signal intensity of the current camping cell A is −95 dbm and the signal intensity of the neighbor cell B is −92 dbm, the signal intensity difference between the neighbor cell B and the current camping cell A is 3 dbm, and the optimized reporting threshold is not reached, thus the A3 event is not reported.

In operation S143, whether to report the A3 event is determined according to standard network configuration, when the signal intensity of the current camping cell in the measurement result is lower than the threshold.

The standard network configuration includes non-optimized reporting parameters. In a specific embodiment, when the optimized reference threshold is set to be −90 dbm, the threshold is set to be −100 dbm, and the optimized reporting threshold is 10 dbm, whether to report the A3 event is still determined according to the standard network configuration (i.e. non-optimized reporting parameters), when the signal intensity of the current camping cell is lower than −100 dbm. For example, in the embodiment, whether to report the A3 event is determined according to the standard network configuration, when the signal intensity of current camping cell A is −110 dbm.

In an embodiment, the standard network configuration includes: 1) Entering criteria:

$M_n$+offsetfreq_n+CIO−hysteresis>$M_s$+offsetfreq_s+CIO+eventA3 offset;

obtaining: $M_n$+>$M_s$+offsetfreq_s+CIO+eventA3offset+hysteresis−offsetfreq_n+CIO.

2) Leaving criteria:

$M_n$+offsetfreq_n+CIO+hysteresis>$M_s$+offsetfreq_s+CIO+eventA3 offset;

obtaining: $M_n$+>$M_s$+offsetfreq_s+CIO+eventA3offset−hysteresis−offsetfreq_n+CIO.

$M_n$ represents a signal intensity measurement result of the neighbor cell, offsetfreq_n represents a specific frequency offset of a frequency of the neighbor cell, CIO represents an independent offset of a cell, hysteresis represents an A3 event hysteresis parameter, $M_s$ represents a signal intensity measurement result of the current camping cell, offsetfreq_s represents a specific frequency offset of the current camping cell, and eventA3offset represents an A3 event offset parameter.

According to the standard network configuration, the terminal needs to meet the condition 1) when meeting A3 event reporting, that is, the signal intensity of the neighbor cell is higher than the signal intensity Xdbm of the current camping cell, where X=offsetfreq_s+CIO+eventA3offset+hysteresis−offsetfreq_n+CIO.

In an embodiment, the network handover method may further include the following operations when the number of ping-pong handovers reaches the preset number. A camping period at the current camping cell is detected, and whether to report the A3 event is determined based on the camping period.

In an embodiment, the camping period is the time of the terminal camping in the current camping cell this time. In an embodiment, when the terminal completes cell handover, the camping period of the current camping cell is started to be calculated while the post-handover cell is updated to the current camping cell. The preset period may be set according to actual conditions.

Further, in an embodiment, the operation that whether to report the A3 event is determined based on the camping period includes the following operations. The A3 event is not reported when the camping period does not reach a preset period.

In the embodiment, the A3 event is not reported when the number of ping-pong handovers of the terminal reaches the preset number, but the camping period does not reach the preset period.

In another embodiment, when the number of ping-pong handovers of the terminal reaches the preset number, and when the camping period reaches the preset period, a measurement result obtained by measuring the signal intensities of a current serving cell and a neighbor cell is acquired, an optimized reporting parameter is acquired, and whether to report the A3 event is determined based on the measurement result and the optimized reporting parameter.

Figure 3:
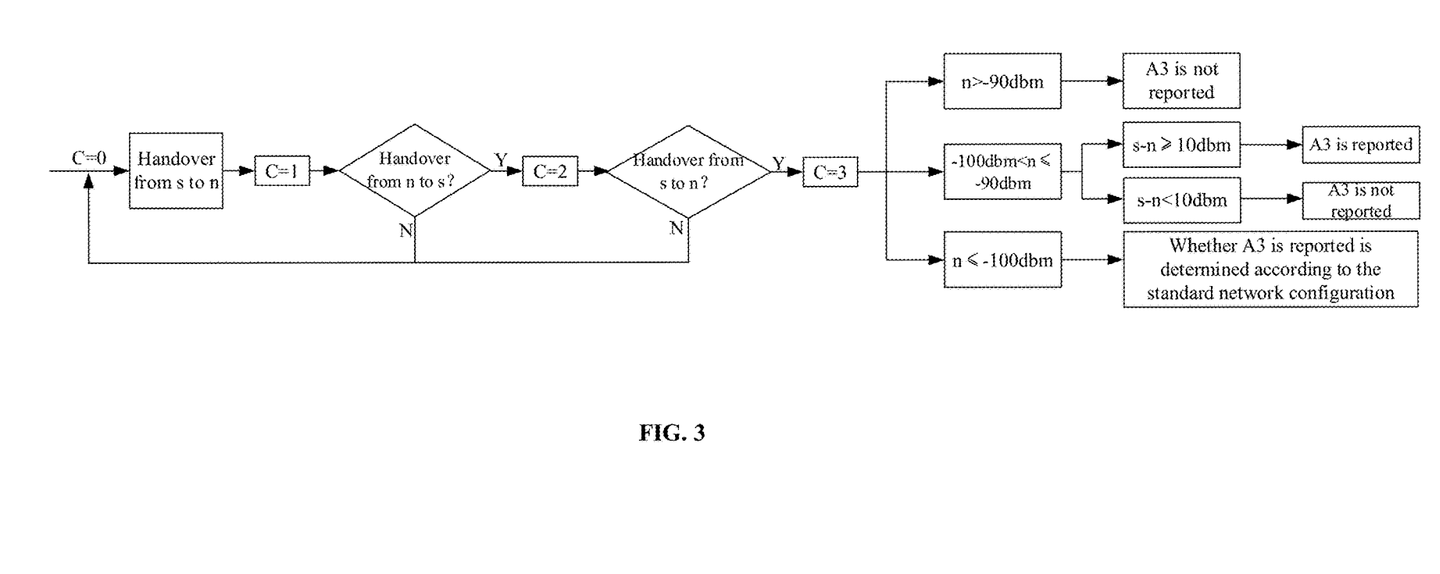
FIG. 3 is a schematic flowchart of network handover operations in a specific embodiment of the disclosure.

In a specific embodiment, FIG. 3 shows a schematic flowchart of the steps of the network handover method in the embodiment. In the embodiment, detailed descriptions are performed by an example where a current camping cell is denoted as s, a neighbor cell is denoted as n, a number of ping-pong handovers is denoted as c, an initial state is c=0, and a preset number is set to be 3.

When a terminal performs cell handover, handover from the current camping cell s to the neighbor cell n is performed, and the handover count is recorded as c=1; the current camping cell is updated to be n, and a last camping cell is updated to be s. When cell handover is performed for the second time, whether a post-handover cell is s is judged, if so, c=2, the current camping cell is updated to be s, and the last camping cell is updated to be n. When cell handover is performed for the third time, whether the post-handover cell is n is judged, if so, c=3, the current camping cell is updated to be n, and the last camping cell is updated to be s. When cell handover is performed for the second time or cell handover is performed for the third time, and when the post-handover cell is not the last camping cell, for example, when the post-handover cell is y, the initial state is returned, c is set to be 0, the pre-handover cell is updated to be the last camping cell (for the second handover, it is n, and for the third handover, it is s), and the current camping cell is updated to be the post-handover cell y.

When c=3 is detected, an optimized reporting parameter, including an optimized reference threshold and an optimized reporting threshold, is acquired. In the embodiment, the optimized reference threshold is −90 dbm, the optimized reporting threshold is 10 dbm, and the threshold is set to be −100 dbm. A measurement result of the signal intensities of the current camping cell and the neighbor cell is acquired. When it is detected that the signal intensity of the current camping cell is higher than −90 dbm, an A3 event is not reported. When it is detected that the signal intensity of the current camping cell is lower than −90 dbm and higher than −100 dbm, whether the signal intensity difference between the neighbor cell and the current camping cell is equal to or greater than 10 dbm is further judged, if so, the A3 event is reported, otherwise, the A3 event is not reported. When it is detected that the signal intensity of the current camping cell is lower than −100 dbm, whether to report the A3 event is determined according to standard network configuration.

In the embodiment, when it is detected that the number of ping-pong handovers of the terminal reaches the preset number, the optimized reporting parameter and the signal intensity measurement result are acquired, and whether to report the A3 event is determined based on the measurement result of the signal intensities of the current camping cell and the neighbor cell and the optimized reporting parameter, so that irrational handovers may be prevented.

In another embodiment, when c=3 is detected, the method further includes the following operations. A camping period of the terminal camping at the current camping cell is recorded; the A3 event is not reported when the camping period does not reach a preset period; when the camping period reaches the preset period, a measurement result obtained by measuring the signal intensities of the current camping cell and the neighbor cell is acquired, the optimized reporting parameter is acquired, and whether to report the A3 event is determined based on the measurement result and the optimized reporting parameter. According to the network handover method in the embodiment, the handover may be constrained in time, and the A3 event is not reported when the camping period at the current camping cell does not reach the preset period, so that irrational handovers may be reduced.

It is to be understood that although various operations in the flowchart in FIG. 1 to FIG. 3 are displayed in sequence according to the indication of an arrow, these operations are not necessarily performed in the sequence indicated by the arrow. Unless specifically stated otherwise here, the operations are not performed in a strictly limited sequence, and the operations may be performed in other sequences. Moreover, at least some of the operations in FIG. 1 to FIG. 3 may include multiple sub-operations or multiple stages, these sub-operations or stages are not necessarily completed at the same moment but may be performed at different moments, and these sub-operations or stages are not necessarily performed in sequence but may be performed in turns or alternately with at least some of other operations or sub-operations or stages of the other operations.

Figure 4:
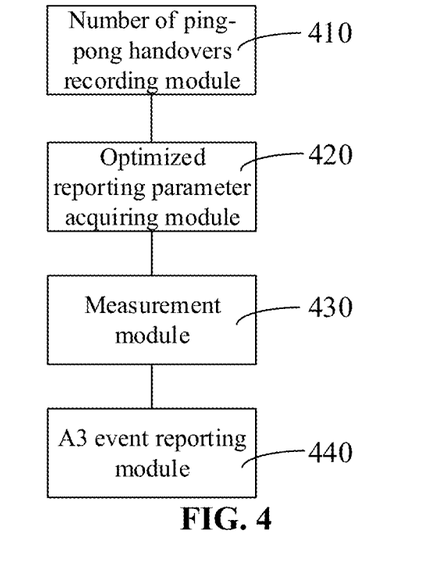
FIG. 4 is a structural block diagram of a network handover apparatus in an embodiment of the disclosure.

In an embodiment, as shown in FIG. 4, a network handover apparatus is provided, which includes a ping-pong handover number recording module 410, an optimized reporting parameter acquiring module 420, a measurement module 430, and an A3 event reporting module 440.

The ping-pong handover number recording module 410 is configured to record a number of ping-pong handovers when a ping-pong handover is detected.

The optimized reporting parameter acquiring module 420 is configured to acquire an optimized reporting parameter when the number of ping-pong handovers reaches a preset number.

The measurement module 430 is configured to measure signal intensities of a current camping cell and a neighbor cell to obtain a measurement result.

In an embodiment, the optimized reporting parameter is a preset parameter for determining whether to report the A3 event when it is detected that the number of ping-pong handovers reaches the preset number, and includes an optimized reference threshold and an optimized reporting threshold. In another embodiment, reporting parameters in the standard network configuration may be adjusted when it is detected that the number of ping-pong handovers reaches the preset number, to obtain the optimized reporting parameter.

The A3 event reporting module 440 is configured to determine, based on the measurement result and the optimized reporting parameter, whether to report an A3 event.

In an embodiment, the ping-pong handover number recording module 410 is configured to: increase the number of ping-pong handovers by 1, update a pre-handover cell to a current last camping cell, and update a post-handover cell to a current camping cell, when the post-handover cell is a last camping cell;

or, set the number of ping-pong handovers to be zero, update the pre-handover cell to the last camping cell, and update the post-handover cell to the current camping cell, when the post-handover cell is not the last camping cell.

In an embodiment, the A3 event reporting module 440 is configured not to report the A3 event when the measurement result is that the signal intensity of the current camping cell is higher than the optimized reference threshold.

The A3 event reporting module is configured to determine whether to report the A3 event based on a signal intensity difference between the neighbor cell and the current camping cell, when the measurement result is that the signal intensity of the current camping cell is lower than the optimized reference threshold and higher than a threshold.

The A3 event reporting module is configured to determine whether to report the A3 event according to standard network configuration, when the measurement result is that the signal intensity of the current camping cell is lower than the threshold.

In an embodiment, the A3 event reporting module 440 is further configured to detect a camping period at the current camping cell, and determine, based on the camping period, whether to report the A3 event.

Specific limitations about the network handover apparatus may refer to limitations to the network handover method, and repeated descriptions are omitted herein. Various modules in the network handover apparatus may be implemented by software, hardware or a combination thereof totally or partially. Various modules may be embedded into or independent from a processor of a computer device in the form of hardware, and may also be stored in a memory of the computer device in the form of software, so that the processor calls to perform the operation corresponding to each of the modules.

Figure 5:
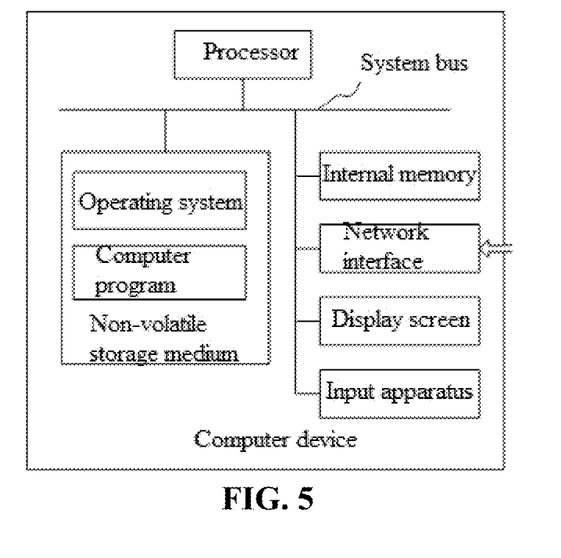
FIG. 5 is an internal structure diagram of a computer device in an embodiment of the disclosure.

In an embodiment, a computer device is provided. The computer device may be a terminal, and an internal structure diagram of the computer device may be as shown in FIG. 5. The computer device includes a processor, a memory, a network interface, a display screen and an input apparatus connected by a system bus. The processor of the computer device is configured to provide computing and control capabilities. The memory of the computer device includes a non-volatile storage medium and an internal memory. The non-volatile storage medium stores an operating system and a computer program. The internal memory provides an environment for the operation of the operating system and the computer program in the non-volatile storage medium. The network interface of the computer device is configured to communicate with an external terminal through a network connection. The computer program is executed by the processor to implement a network handover method. The display screen of the computer device may be a liquid crystal display screen or an electronic ink display screen. The input apparatus of the computer device may be a touch layer covering the display screen or may be a button, a trackball or a trackpad disposed on a housing of the computer device, or may also be an external keyboard, a trackpad or a mouse.

Those skilled in the art may understand that the structure shown in FIG. 5 is only a block diagram of partial structure associated with the solution of the disclosure, and is not intended to limit the computer device to which the solution of the disclosure is applied, and specifically, the computer device may include more or less parts than those shown in the figure, or combine some parts, or have different part arrangements.

In an embodiment, the disclosure provides a computer device, which includes a memory and a processor, herein the memory stores a computer program, and the processor implements the following operations when executing the computer program.

A number of ping-pong handovers is recorded when a ping-pong handover is detected.

An optimized reporting parameter is acquired when the number of ping-pong handovers reaches a preset number.

Signal intensities of a current camping cell and a neighbor cell are measured to obtain a measurement result.

Whether an A3 event is reported is determined based on the measurement result and the optimized reporting parameter.

In an embodiment, the processor also implements the following operations when executing the computer program.

The number of ping-pong handovers is increased by 1, a pre-handover cell is updated to a current last camping cell, and a post-handover cell is updated to a current camping cell, when the post-handover cell is a last camping cell.

In an embodiment, the processor also implements the following operations when executing the computer program. The number of ping-pong handovers is set to be zero, the pre-handover cell is updated to the last camping cell, and the post-handover cell is updated to the current camping cell, when the post-handover cell is not the last camping cell.

In an embodiment, the processor also implements the following operations when executing the computer program. The optimized reporting parameter includes an optimized reference threshold and an optimized reporting threshold.

In an embodiment, the processor also implements the following operations when executing the computer program. The operation that whether to report the A3 event is determined based on the measurement result and the optimized reporting parameter includes the following operations.

The A3 event is not reported when the measurement result is that the signal intensity of the current camping cell is higher than the optimized reference threshold.

Whether to report the A3 even is determined based on a signal intensity difference between the neighbor cell and the current camping cell, when the measurement result is that the signal intensity of the current camping cell is lower than the optimized reference threshold and higher than a threshold.

Whether to report the A3 event is determined according to standard network configuration, when the measurement result is that the signal intensity of the current camping cell is lower than the threshold.

In an embodiment, the processor also implements the following operations when executing the computer program. The operation that whether to report the A3 event is determined based on the signal intensity difference between the neighbor cell and the current camping cell, when the measurement result is that the signal intensity of the current camping cell is lower than the optimized reference threshold and higher than the threshold includes the following operations.

The A3 event is reported when the signal intensity difference between the neighbor cell and the current camping cell reaches the optimized reporting threshold.

The A3 event is not reported when the signal intensity difference between the neighbor cell and the current camping cell does not reach the optimized reporting threshold.

In an embodiment, the processor also implements the following operations when executing the computer program. The following operations are further included when the number of ping-pong handovers reaches the preset number.

A camping period at the current camping cell is detected, and whether to report the A3 event is determined based on the camping period.

In an embodiment, the processor also implements the following operations when executing the computer program. The operation that whether to report the A3 event is determined based on the camping period includes the following operations.

The A3 event is not reported when the camping period does not reach a preset period.

In an embodiment, the disclosure provides a computer-readable storage medium, having a computer program stored thereon, herein the computer program implements the following operations when being executed by a processor.

A number of ping-pong handovers is recorded when a ping-pong handover is detected.

An optimized reporting parameter is acquired when the number of ping-pong handovers reaches a preset number.

Signal intensities of a current camping cell and a neighbor cell are measured to obtain a measurement result.

Whether to report an A3 event is determined based on the measurement result and the optimized reporting parameter.

In an embodiment, the computer program also implements the following operations when being executed by the processor.

The operation that the number of ping-pong handovers is recorded includes the following operations.

The number of ping-pong handovers is increased by 1, a pre-handover cell is updated to a current last camping cell, and a post-handover cell is updated to a current camping cell, when the post-handover cell is a last camping cell.

Or, the number of ping-pong handovers is set to be zero, the pre-handover cell is updated to the last camping cell, and the post-handover cell is updated to the current camping cell, when the post-handover cell is not the last camping cell.

In an embodiment, the computer program also implements the following operations when being executed by the processor.

The optimized reporting parameter includes an optimized reference threshold and an optimized reporting threshold.

In an embodiment, the computer program also implements the following operations when being executed by the processor.

The operation that whether to report the A3 event is determined based on the measurement result and the optimized reporting parameter includes the following operations.

The A3 event is not reported when the measurement result is that the signal intensity of the current camping cell is higher than the optimized reference threshold.

Whether to report the A3 event is determined based on a signal intensity difference between the neighbor cell and the current camping cell, when the measurement result is that the signal intensity of the current camping cell is lower than the optimized reference threshold and higher than a threshold.

Whether to report the A3 event is determined according to standard network configuration, when the measurement result is that the signal intensity of the current camping cell is lower than the threshold.

In an embodiment, the computer program also implements the following operations when being executed by the processor. The operation that whether to report the A3 event is determined based on the signal intensity difference between the neighbor cell and the current camping cell, when the measurement result is that the signal intensity of the current camping cell is lower than the optimized reference threshold and higher than the threshold includes the following operations.

The A3 event is reported when the signal intensity difference between the neighbor cell and the current camping cell reaches the optimized reporting threshold.

The A3 event is not reported when the signal intensity difference between the neighbor cell and the current camping cell does not reach the optimized reporting threshold.

In an embodiment, the computer program also implements the following soperations when being executed by the processor. A camping period at the current camping cell is detected, and whether to report the A3 event is determined based on the camping period.

In an embodiment, the computer program also implements the following operations when being executed by the processor. Whether to report the A3 event is determined based on the camping period includes the following operations.

The A3 event is not reported when the camping period does not reach a preset period.

According to the network handover apparatus, the computer device and the storage medium, a handover count is recorded when it is detected that a ping-pong handover occurs in a terminal network. When the number of ping-pong handovers reaches a preset number, whether to report an A3 event is determined based on a measurement result obtained after measuring signal intensities of a current camping cell and a neighbor cell, and an acquired optimized reporting parameter. By the method, when the number of ping-pong handovers of a terminal reaches the preset number, whether to report the A3 event is determined according to the optimized reporting parameter and the measurement result, so that irrational handovers may be prevented as much as possible, thereby improving the user experience.

Those of ordinary skill in the art may understand that all or part of the operations in the method embodiments may be implemented by a computer program to instruct related hardware, and the computer program may be stored in a non-volatile computer-readable storage medium. When the computer program is executed, the operations of each of the method embodiments as described above may be included. Any reference used in embodiments of the disclosure to a memory, storage, a database or other media may include at least one of non-volatile or volatile memories. The non-volatile memory may include a Read Only Memory (ROM), a Programmable ROM (PROM), an Electrically Programmable ROM (EPROM), an Electrically Erasable Programmable ROM (EEPROM), or a flash memory. The volatile memory may include a Random Access Memory (RAM) or an external cache. As an illustration rather than limitation, RAM may be obtained in multiple forms such as a Static RAM (SRAM), a Dynamic RAM (DRAM), a Synchronous DRAM (SDRAM), a Dual Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM), etc.

The technical features of the above embodiments may be combined arbitrarily, and in order to simplify the description, all possible combinations of the technical features of the above embodiments are not described. However, as long as there is no conflict when combining these technical features, they should be considered to be the scope of the specification.

The above embodiments only describe several implementations of the disclosure specifically and in detail, but cannot be understood as limitation of the scope of the disclosure. It is to be pointed out that those of ordinary skill in the art may also make several variations and improvements without departing from the concept of the disclosure. These variations and improvements fall within the scope of protection of the disclosure. Therefore, the scope of protection of the disclosure should be determined by the appended claims.

The invention claimed is:

1. A network handover method, comprising:
    recording a number of ping-pong handovers in response to a ping-pong handover being detected;
    acquiring an optimized reporting parameter when the number of ping-pong handovers reaches a preset number;
    measuring signal intensities of a current camping cell and a neighbor cell to obtain a measurement result; and determining, based on the measurement result and the optimized reporting parameter, whether to report an A3 event,
wherein recording the number of ping-pong handovers comprises:
when a post-handover cell is a last camping cell, increasing the number of ping-pong handovers by 1, updating a pre-handover cell to a current last camping cell, and updating the post-handover cell to a current camping cell; or
when a post-handover cell is not a last camping cell, setting the number of ping-pong handovers to be zero, updating a pre-handover cell to a last camping cell, and updating the post-handover cell to a current camping cell.

2. The method of claim 1, wherein the optimized reporting parameter comprises an optimized reference threshold and an optimized reporting threshold.

3. The method of claim 2, wherein determining, based on the measurement result and the optimized reporting parameter, whether to report the A3 event comprises:
not reporting the A3 event when the signal intensity of the current camping cell in the measurement result is higher than the optimized reference threshold;
determining, based on a signal intensity difference between the neighbor cell and the current camping cell, whether to report the A3 event, when the signal intensity of the current camping cell in the measurement result is lower than the optimized reference threshold and higher than a threshold; and
determining, according to a standard network configuration, whether to report the A3 event, when the signal intensity of the current camping cell in the measurement result is lower than the threshold.

4. The method of claim 3, wherein determining, based on the signal intensity difference between the neighbor cell and the current camping cell, whether to report the A3 event, when the signal intensity of the current camping cell in the measurement result is lower than the optimized reference threshold and higher than the threshold comprises:
reporting the A3 event when the signal intensity difference between the neighbor cell and the current camping cell reaches the optimized reporting threshold; and
not reporting the A3 event when the signal intensity difference between the neighbor cell and the current camping cell does not reach the optimized reporting threshold.

5. The method of claim 1, further comprising: when the number of ping-pong handovers reaches the preset number,
detecting a camping period at the current camping cell; and
determining, based on the camping period, whether to report the A3 event.

6. The method of claim 5, wherein determining, based on the camping period, whether to report the A3 event comprises:
not reporting the A3 event when the camping period does not reach a preset period.

7. A computer device, comprising:
a memory for storing a computer program; and
a processor,
wherein the processor is configured to execute the computer program to perform the following operations:
recording a number of ping-pong handovers in response to a ping-pong handover being detected;
acquiring an optimized reporting parameter when the number of ping-pong handovers reaches a preset number;
measuring signal intensities of a current camping cell and a neighbor cell to obtain a measurement result; and
determining, based on the measurement result and the optimized reporting parameter, whether to report an A3 event,
wherein the processor is further configured to:
when a post-handover cell is a last camping cell, increase the number of ping-pong handovers by 1, update a pre-handover cell to a current last camping cell, and update the post-handover cell to a current camping cell; or
when a post-handover cell is not a last camping cell, set the number of ping-pong handovers to be zero, update a pre-handover cell to a last camping cell, and update the post-handover cell to a current camping cell.

8. The computer device of claim 7, wherein the optimized reporting parameter comprises an optimized reference threshold and an optimized reporting threshold.

9. The computer device of claim 8, wherein the processor is further configured to:
not report the A3 event when the signal intensity of the current camping cell in the measurement result is higher than the optimized reference threshold;
determine, based on a signal intensity difference between the neighbor cell and the current camping cell, whether to report the A3 event, when the signal intensity of the current camping cell in the measurement result is lower than the optimized reference threshold and higher than a threshold; and
determine, according to a standard network configuration, whether to report the A3 event, when the signal intensity of the current camping cell in the measurement result is lower than the threshold.

10. The computer device of claim 9, wherein the processor is further configured to:
report the A3 event when the signal intensity difference between the neighbor cell and the current camping cell reaches the optimized reporting threshold; and
not report the A3 event when the signal intensity difference between the neighbor cell and the current camping cell does not reach the optimized reporting threshold.

11. The computer device of claim 7, wherein the processor is further configured to: when the number of ping-pong handovers reaches the preset number,
detect a camping period at the current camping cell; and
determine, based on the camping period, whether to report the A3 event.

12. The computer device of claim 11, wherein the processor is further configured to: not report the A3 event when the camping period does not reach a preset period.

13. A non-transitory computer-readable storage medium, having a computer program stored thereon, wherein the computer program, when being executed by a processor, cause the processor to implement the following operations:
recording a number of ping-pong handovers in response to a ping-pong handover being detected;
acquiring an optimized reporting parameter when the number of ping-pong handovers reaches a preset number;
measuring signal intensities of a current camping cell and a neighbor cell to obtain a measurement result; and
determining, based on the measurement result and the optimized reporting parameter, whether to report an A3 event, wherein the computer program, when being executed by a processor, cause the processor to:
when a post-handover cell is a last camping cell, increase the number of ping-pong handovers by 1, update a pre-handover cell to a current last camping cell, and update the post-handover cell to a current camping cell; or
when a post-handover cell is not a last camping cell, set the number of ping-pong handovers to be zero, update a pre-handover cell to a last camping cell, and update the post-handover cell to a current camping cell.

14. The non-transitory computer-readable storage medium of claim 13, wherein the optimized reporting parameter comprises an optimized reference threshold and an optimized reporting threshold.

15. The non-transitory computer-readable storage medium of claim 14, wherein the computer program, when being executed by a processor, cause the processor to:
not report the A3 event when the signal intensity of the current camping cell in the measurement result is higher than the optimized reference threshold;
determine, based on a signal intensity difference between the neighbor cell and the current camping cell, whether to report the A3 event, when the signal intensity of the current camping cell in the measurement result is lower than the optimized reference threshold and higher than a threshold; and
determine, according to a standard network configuration, whether to report the A3 event, when the signal intensity of the current camping cell in the measurement result is lower than the threshold.

16. The non-transitory computer-readable storage medium of claim 15, wherein the computer program, when being executed by a processor, cause the processor to:
report the A3 event when the signal intensity difference between the neighbor cell and the current camping cell reaches the optimized reporting threshold; and
not report the A3 event when the signal intensity difference between the neighbor cell and the current camping cell does not reach the optimized reporting threshold.

17. The non-transitory computer-readable storage medium of claim 13, wherein the computer program, when being executed by a processor, cause the processor to:
when the number of ping-pong handovers reaches the preset number,
detect a camping period at the current camping cell; and
determine, based on the camping period, whether to report the A3 event.

* * * * *